(12) United States Patent
Hallsten

(10) Patent No.: US 8,271,011 B2
(45) Date of Patent: Sep. 18, 2012

(54) AUDIENCE RESPONSE SYSTEM BULK DATA COMMUNICATION

(75) Inventor: Jonathan A Hallsten, Barberton, OH (US)

(73) Assignee: Turning Technologies, LLC, Youngstown, OH (US)

( * ) Notice: Subject to any disclaimer, the term of this patent is extended or adjusted under 35 U.S.C. 154(b) by 194 days.

(21) Appl. No.: 12/852,728

(22) Filed: Aug. 9, 2010

(65) Prior Publication Data

US 2012/0032790 A1    Feb. 9, 2012

Related U.S. Application Data

(63) Continuation of application No. PCT/US2010/044478, filed on Aug. 4, 2010.

(51) Int. Cl.
*H04B 7/00* (2006.01)
(52) U.S. Cl. ........................................ 455/510; 455/111
(58) Field of Classification Search ................. 455/2.01, 455/3.06, 415, 41.2, 510
See application file for complete search history.

(56) References Cited

U.S. PATENT DOCUMENTS 5,724,357 A * 3/1998 Derks ........................... 370/313
2003/0204437 A1 10/2003 Flender et al.
2008/0119134 A1 5/2008 Rao
2009/0279466 A1 * 11/2009 Ji et al. ........................... 370/311
2010/0178645 A1 * 7/2010 Ieperen et al. ................. 434/323

FOREIGN PATENT DOCUMENTS

EP   1739886   1/2007

OTHER PUBLICATIONS

Corresponding PCT Application No. PCT/US2010/044478 filed Aug. 4, 2010; International Search Report and Written Opinion of the International Searching Authority; Korean Patent Office Authorized Examiner; Apr. 14, 2011 (6 pages).

* cited by examiner

*Primary Examiner* — Tu X Nguyen
(74) *Attorney, Agent, or Firm* — Benesch, Friedlander Coplan & Aronoff LLP

(57) ABSTRACT

A method for a response device in an audience response system having a plurality of response devices to wirelessly communicate bulk data includes transmitting a signal and receiving data indicating to the response device to transmit data requests. The method further includes transmitting data request signals, and receiving at least data describing the bulk data in response to a first data request signal and at least a portion of the bulk data in response to a second data request signal.

21 Claims, 5 Drawing Sheets

US 8,271,011 B2

AUDIENCE RESPONSE SYSTEM BULK DATA COMMUNICATION

FIELD OF THE INVENTION

The present application relates to an audience response system. More particularly, the present application relates to devices and methods for implementing bulk data communication in an audience response system.

BACKGROUND

Audience response systems are used in classroom settings, corporate meetings, or in other gatherings to communicate responses to questions.

Audience response systems commonly incorporate one or more bases and a plurality of response devices. The response devices receive responses to questions in the form of user selections on a keypad. The response devices transmit wireless signals encoding the user selections to the base units or host computers.

An audience response system may include large numbers of response devices that seek to communicate with the base unit within the same time period to transmit user selections. The large number of response devices may lead to signal collisions and high retransmission rates to get data across the communication link between response device and base unit.

Conventional audience response systems transmit mainly data corresponding to user responses to questions. User responses commonly require relatively small amounts of data, which helps reduce some of the collision and retransmission issues.

SUMMARY OF THE INVENTION

A method for a response device in an audience response system having a plurality of response devices to wirelessly communicate bulk data includes transmitting a signal and receiving data indicating to the response device to transmit data requests. The method further includes transmitting data request signals, and receiving at least data describing the bulk data in response to a first data request signal and at least a portion of the bulk data in response to a second data request signal.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
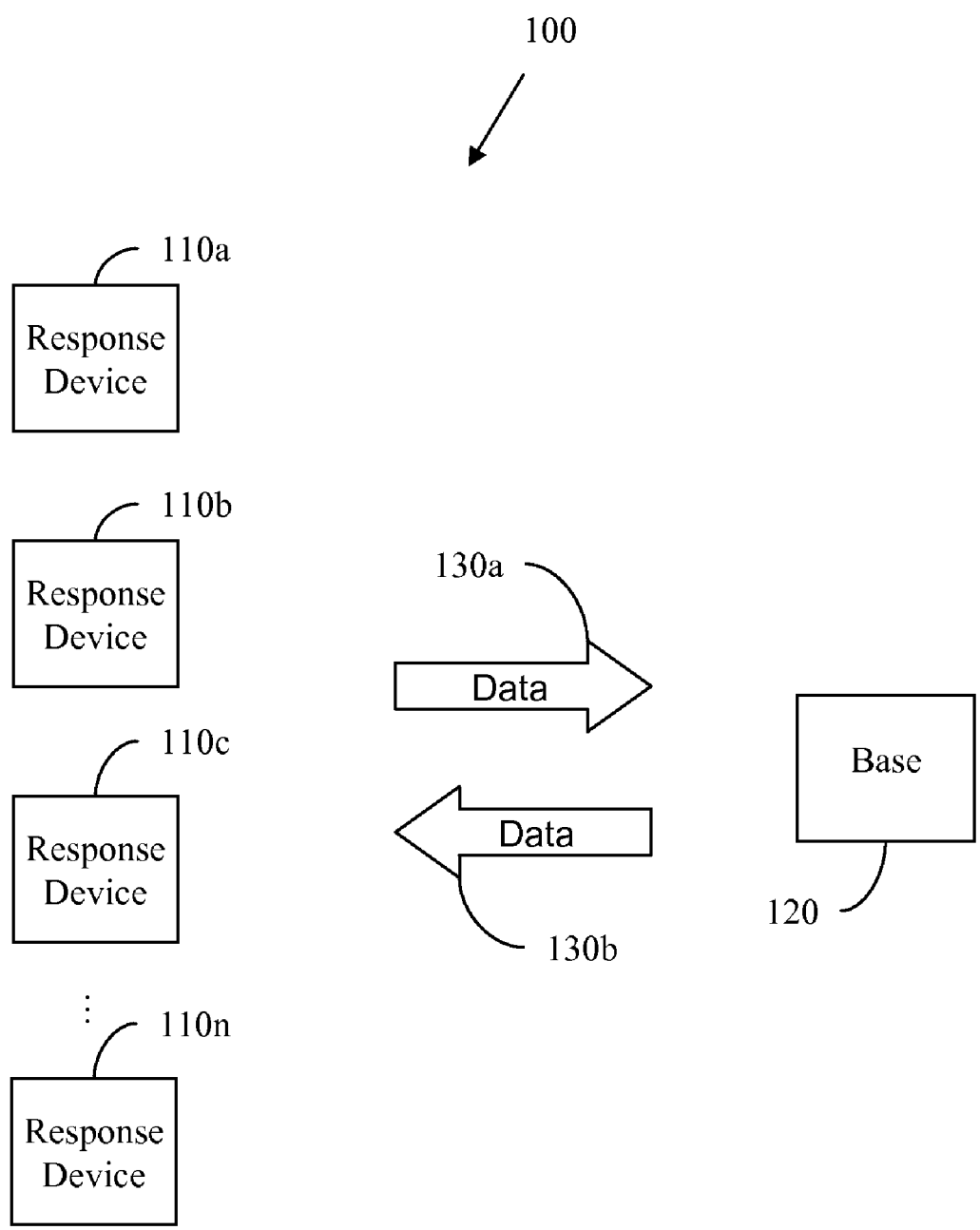
FIG. 1 illustrates a schematic of an exemplary audience response system.

The following includes definitions of selected terms employed herein. The definitions include various examples, forms, or both of components that fall within the scope of a term and that may be used for implementation. The examples are not intended to be limiting. Both singular and plural forms of terms may be within the definitions.

"Data communication," as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11, IEEE 802.15), an Ethernet system (e.g., IEEE 802.3), a token ring system (e.g., IEEE 802.5), a local area network (LAN), a wide area network (WAN), a point-to-point system, a circuit switching system, a packet switching system, combinations thereof, and so on.

"Computer-readable medium," as used herein, refers to a medium that participates in directly or indirectly providing signals, instructions or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servelet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Java Script, Java.NET, ASP.NET, VB.NET, Cocoa, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

"Audience response system," as used herein, includes but is not limited to systems for interaction between audience members and an entity or entities that collect responses from the audience members. Audience members may be collocated or remote from each other or from an entity collecting the responses. Audience response systems may be used in conjunction with presentation software or may be used without presentation software. Audience response systems may take the form of a base as the entity collecting the responses and wired or wireless devices as the means for users to select their responses to the questions presented. Audience response systems may also take the form of interactive whiteboards where a whiteboard may be used as the means for users to select their responses to the questions presented.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates a schematic of an exemplary audience response system 100. System 100 includes a plurality of response devices 110a-n. Although four response devices are shown, it should be understood that an audience response system may have as few as one response device or as many as hundreds, or even thousands, of response devices. The response devices may be handheld devices, or may be embedded in a stationary object, such as a chair or desk. The response devices may also be any other devices capable of communicating in an audience response system such as computers (e.g. laptop, PC, tablet, and so on), mobile phones, smart phones, etc. The response devices may be dedicated devices or may be multi-task devices.

The system 100 also includes at least one base 120. The base 120 receives data 130a from the response devices 110a-n and the base 120 transmits data 130b to the response devices 110a-n. The base 120 may be a computer (e.g. laptop, PC, tablet, and so on), multiple computers, a device connected to a computer, a device independent from a computer, combinations thereof, and so on. Although a single base is shown, it should be understood that an audience response system may include several bases. In systems with multiple bases, each base may be configured to communicate with preselected response devices. Alternatively, each base may be configured to communicate with any response device.

In the illustrated embodiment, the response devices 110a-n and the base 120 communicate data 130a-b wirelessly. In one embodiment, the response devices 110a-n and the base 120 transmit and receive radio frequency (RF) signals encoding the data. In another embodiment, the response devices 110*a-n* and the base 120 transmit and receive infrared (IR) signals encoding the data.

Figure 2:
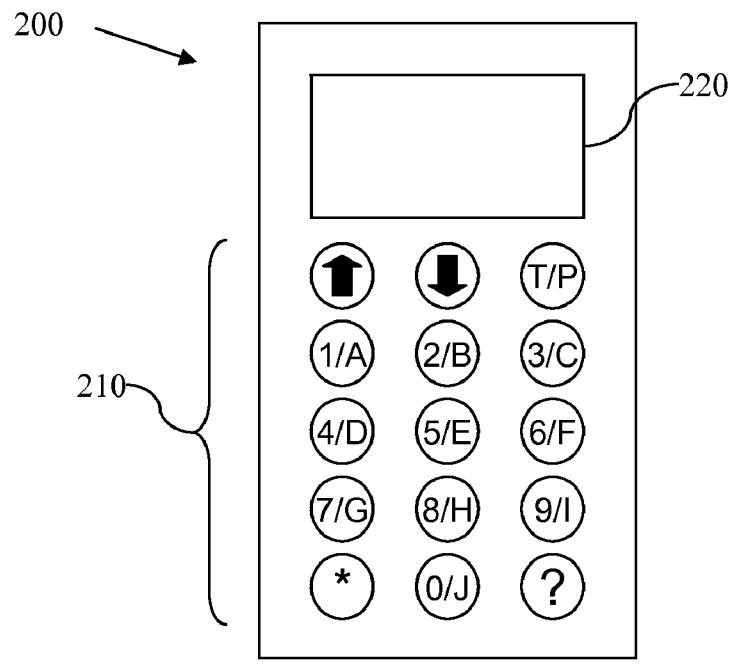
FIG. 2 illustrates a front view of an exemplary embodiment of a response device in an audience response system.

FIG. 2 illustrates a front view of an exemplary embodiment of a response device 200. The response device 200 is an exemplary embodiment of the response devices 110 shown in FIG. 1. The response device 200 communicates wirelessly in an audience response system, such as system 100 described above, having a plurality of response devices. The device 200 includes a keypad 210 and a display 220. In alternative embodiments, other inputs may be employed, such as touch screens, dials, knobs, click wheels, roller balls, and roller pads. Similarly, other outputs may be employed, such as LED indicators. In other embodiments, the response device does not include a display.

In the illustrated embodiment, the keypad 210 includes a number of alpha-numeric keys and additional function keys for a user to enter information including responses to audience response questions during a polling or test session. A user may also use the keypad 210 to enter other types of information including log-in or sign-in information, setup information, administrative information regarding a polling or testing session, and so on. In other embodiments, the keypad may include keys in other formats other than alpha-numeric or the keypad may include a touch screen.

In alternative embodiments, other input devices may be employed instead of a keypad. Exemplary input devices include touch screens, click wheels, roller balls, dials, knobs, and switches.

In the illustrated embodiment, the display 220 is a liquid crystal display (LCD) configured to display various information related to audience response sessions (e.g. unit ID, user ID, question ID, response entered, response received, time left in the session, time left to answer a question, and so on). The display 220 may also display device status information (e.g. on/off, battery life, transmission channel, and so on).

In alternative embodiments, other output devices may be employed instead of an LCD. Exemplary output devices include touch screens and light emitting diodes (LED).

Figure 3:
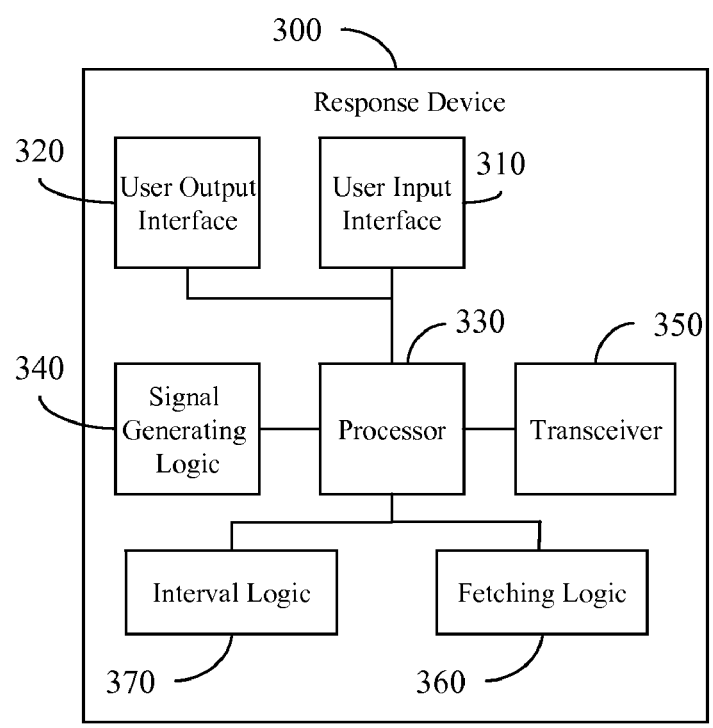
FIG. 3 illustrates an exemplary block diagram of a response device in an audience response system.

FIG. 3 illustrates an exemplary block diagram illustrating components of a response device 300. The response device 300 is configured to wirelessly receive bulk data. It should be understood that the device 300 may be the same as device 200 of FIG. 2. However, device 300 is not limited to such a configuration.

Within the context of this disclosure, bulk data is a large amount of data that at least in part because of its size is transmitted to the response device in multiple portions rather than as a whole. Bulk data may also include data that is transmitted in portions rather than as a whole because only the portions and not the whole exist when the bulk data transmission process begins. In this case, the existing portions may be transmitted and the remaining portions may come into existence during the bulk data transmission process. Examples of bulk data include multiple questions corresponding to a multiple question exam, data corresponding to a firmware update for the response device 300, and so on.

Device 300 includes a user input interface 310 configured to receive user selections. A user selection may take the form of a key press in an alpha-numeric keypad such as keypad 210 described above. Thus, the user input interface 310 may take the form of the alpha-numeric keypad 210. The user input interface 310 may also take the form of various other user input interfaces (e.g. pointing device, wheel, soft keys, slide meter, combinations thereof, and so on).

The device 300 further includes a user output interface 320. The user output interface 320 may take the form of a display such as display 220 discussed above. The user output interface 320 may also take the form of various other user output interfaces (e.g. LED, LED displays, LCD, combinations thereof, and so on).

The device 300 also includes a processor 330. The processor 330 operably connects to the user input interface 310 and the user output interface 320. The processor 330 receives from the user input interface 310 data representing the user selections.

The device 300 further includes a signal generating logic 340. The signal generating logic 340 operably connects to the processor 330. The signal generating logic 340 generates signals encoding data for transmission in the audience response system. The data encoded in the signals may include: a) a user identifier that uniquely identifies a user of the response device, b) a globally unique identifier (GUID), and c) a response device identifier that uniquely identifies the response device in the audience response system, and so on.

Among the signals that the signal generating logic 340 can generate are user selection signals. A user selection signal is a signal associated with and generated in response to a user selection or multiple user selections. A user selection signal commonly encodes data representing the user selection or multiple user selections.

The device 300 also includes a transceiver 350 which operably connects to the processor 330. The transceiver 350 transmits wireless signals encoded by the signal generating logic 340. The transceiver 350 also receives wireless signals. Although the transceiver 350 is illustrated as separate from the processor 330, it should be understood that the transceiver 350 and processor 330 may be part of the same component. In an alternative embodiment (not shown), the transceiver 350 may be implemented as a discrete transmitter and a separate receiver.

In one embodiment, for every signal transmitted by the transceiver 350, a corresponding signal is expected to be received. The transceiver 350 repeats transmission of the signal until the transceiver 350 receives a corresponding signal or until a predetermined number of transmissions or predetermined time for receipt of the corresponding signal expires.

Among the signals received by the transceiver 350 are acknowledgement signals. Acknowledgement signals are signals transmitted by the base and received by the response device 300. In an acknowledgement signal the base may indicate to the response device 300 that the base received and accepted a transmission from the response device 300.

In one embodiment, an acknowledgement signal may encode data indicating to the response device 300 to transmit data request signals. A data request signal is a signal that indicates to the base receiving the data request signal to transmit the bulk data. In response to receipt of the acknowledgement signal encoding data indicating to the response device 300 to transmit data request signals, the signal generating logic 340 generates data request signals and the transceiver 350 transmits the data request signals.

In response to transmission of each data request signal, the device 300 expects receipt of a corresponding acknowledgement signal. If the device 300 does not receive a corresponding acknowledgement signal within an time interval (e.g. two seconds, five seconds, and so on), the transceiver 350 may retransmit the data request signal. If the device 300 does not receive a corresponding acknowledgement signal after a number of retransmissions or after a time interval, the device 300 may declare a data request failure.

In one embodiment, in response to transmission of data request signals, the transceiver 350 receives an acknowledgement signal corresponding to each of the data request signals transmitted, and, in addition to the acknowledgement signal, the transceiver 350 receives a bulk data signal corresponding to each of the data request signals transmitted. In another embodiment, in response to transmission of data request signals, the transceiver 350 receives only a bulk data signal corresponding to each of the data request signals transmitted. In this embodiment, the bulk data signals themselves may serve as acknowledgement that the data request signal transmissions were received.

A bulk data signal may encode data describing the bulk data. For example, data describing bulk data may be data indicating a total number of data requests that the response device 300 would have to transmit to receive the entire bulk data from the base. In the multiple question exam example, data describing the bulk data may also include data indicating the total number of questions in the multiple question exam, data indicating one or more formats (e.g. fill in the blank, multiple choice, single answer numeric, single answer alpha, true or false, multi-answer numeric, multi-answer alpha, and so on) of the questions in the multiple question exam, the test version, whether test version verification is required, whether student identification is required, class (e.g. biology, chemistry, and so on), whether the exam is timed, whether the exam is auto-graded, whether the exam is high-stakes, and so on. In the firmware update example, data describing the bulk data may also include data describing the firmware update.

A bulk data signal may also encode a portion of the bulk data. Each bulk data signal encoding a portion of the bulk data communicates its corresponding portion of the bulk data from the base to the response device 300. The aggregate of the bulk data signals communicates the entire bulk data.

In response to data request signals, the transceiver 350 may receive bulk data signals, signals encoding data describing the bulk data and signals encoding a portion of the bulk data, in any order. In one embodiment, the transceiver receives three bulk data signals encoding data describing the bulk data in response to the first three data request signals transmitted and a fourth bulk data signal encoding a portion of the bulk data in response to the fourth data request signal transmitted. In other embodiments, in response to data request signals, the transceiver may receive more or less than three bulk data signals encoding data describing the bulk data in response to the first three data request signals transmitted. For example, the transceiver may receive a bulk data signal encoding data describing the bulk data in response to the first data request signal transmitted, a bulk data signal encoding a portion of the bulk data in response to the second data request signal transmitted, and another bulk data signal encoding data describing the bulk data in response to the third data request signal transmitted.

In some embodiments, a bulk data signal may encode data indicating that either the data describing or representing at least a portion of the bulk data or the portion of the bulk data due next for transmission is not ready for transmission. In these cases, the data describing or representing at least a portion of the bulk data or the portion of the bulk data due next for transmission would be encoded in a later received bulk data signal.

In one embodiment, the base receiving a data request signal may transmit bulk data signals to the response device 300 as the bulk data becomes available. In other embodiments, the base receiving the data request signal may transmit bulk data signals to the response device 300 at time intervals other than as the bulk data becomes available.

The response device 300 includes a fetching logic 360 operably connected to the processor 330. The fetching logic 360 instructs the transceiver 350 when to transmit data request signals.

In one embodiment, the fetching logic 360 tracks a pace at which the bulk data received is being consumed by the response device 300 and indicates to the transceiver 350 to transmit the data request signals such that bulk data signals are received at a rate that substantially corresponds to the pace at which the bulk data received is being consumed.

For example, if the bulk data corresponds to a multiple question exam, the fetching logic 360 may determine the pace at which a user of the response device (the person taking the multiple question exam) responds to questions in the exam. Additional questions may be fetched at a rate corresponding to the user's pace in responding questions in the exam. Therefore, the fetching logic 360 indicates to the transceiver 350 to transmit data request signals such that bulk data signals encoding the additional questions are received at a rate that substantially corresponds to the user's pace.

In another example, if the bulk data corresponds to a firmware update, the fetching logic 360 may determine the pace at which the firmware is being installed. Additional portions of the firmware update may be fetched at a rate corresponding to the pace at which the firmware is being installed. Therefore, the fetching logic 360 indicates to the transceiver 350 to transmit data request signals such that bulk data signals encoding the additional portions of the firmware update are received at a rate that substantially corresponds to the pace of the install.

In one embodiment, the fetching logic 360 determines when milestones in the consumption of the bulk data received are reached and indicates to the transceiver 350 to transmit data request signals such that bulk data signals are received at times substantially corresponding to the reaching of the milestones. Examples of milestones include: a) a percentage of the entire bulk data has been consumed, b) a percentage of the received bulk data has been consumed, c) a marker in the bulk data has been reached, d) the end of the received bulk data has been reached, e) a question in a multiple question exam has been reached, f) a question in a multiple question exam has been selected out of order, and so on.

In one embodiment, the transceiver 350 scans for radio frequency signal traffic of the audience response system. Based on the signal traffic information, the fetching logic 360 indicates to the transceiver 350 to transmit data request signals at times when the signal traffic is below a predetermined threshold such that the probability of successful transmissions of the data request signals and the corresponding bulk data signals is increased (e.g. less collisions, and so on).

The response device 300 further includes an interval logic 370, which operably connects to the processor 330 and the fetching logic 360. The interval logic 370 indicates time intervals for transmission of signals. The intervals may be generated by the interval logic or the intervals may be predetermined and stored in the interval logic. In one embodiment, the interval logic 370 indicates time intervals for transmission of data request signals. For example, the transceiver 350 may transmit a data request signal. After expiration of a first time interval, the transceiver 350 transmits a second data request signal. After expiration of a second time interval, the transceiver 350 transmits a third data request signal, and so on. In one embodiment, time intervals are measured from the time of transmission of data request signals. In another embodiment, time intervals are measured from receipt of acknowledgement signals or bulk data signals corresponding to the transmitted data request signals.

In one embodiment, the interval logic 370 generates time intervals for transmission of data request signals that are of the same time length. In another embodiment, the interval logic 370 generates time intervals that are of different time lengths. In one embodiment, the interval logic 370 generates time intervals whose lengths are selected at random or at random from a range practical time lengths (e.g. microseconds, seconds, minutes, and so on) or from a set of discrete time lengths. In another embodiment, the interval logic 370 generates time intervals according to an algorithm.

Figure 4:
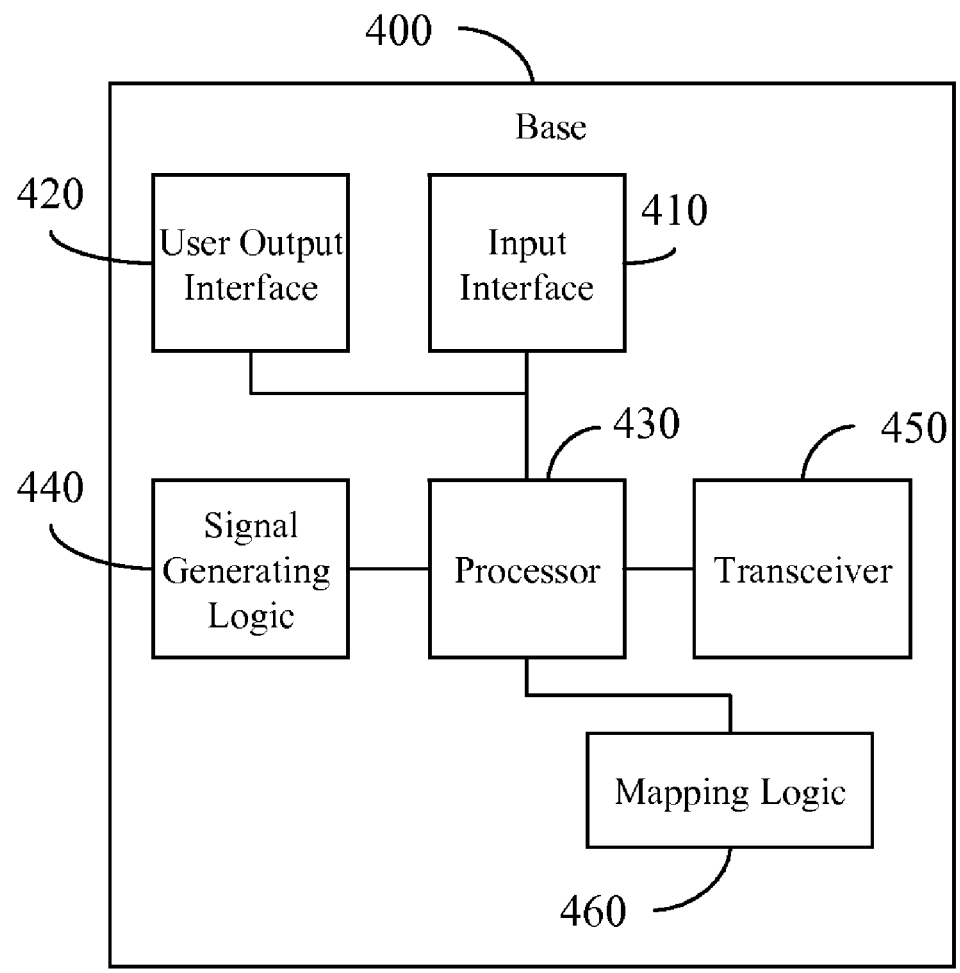
FIG. 4 illustrates an exemplary block diagram of a base in an audience response system.

FIG. 4 illustrates an exemplary block diagram of a base 400. The base 400 is configured to wirelessly transmit bulk data. The base 400 may be a computer (e.g. laptop, PC, tablet, and so on), multiple computers, a device connected to a computer, a device independent from a computer, combinations thereof, and so on.

In one embodiment, the base 400 includes an input interface 410 and an output interface 420. The base 400 may be in data communication with a computer (e.g. laptop, PC, mobile device, and so on) (not shown) through the input interface 410 and the output interface 420. The output interface 420 may take the form of a display (e.g. LED, LED displays, LCD, combinations thereof, and so on).

The base 400 also includes a processor 430. The processor 430 operably connects to the input interface 410 and the output interface 420. The processor 430 may receive data from the input interface 410 and transmit data to the output interface 420.

The base 400 further includes a signal generating logic 440. The signal generating logic 440 operably connects to the processor 430. The signal generating logic 440 encodes and decodes data in signals for communication in the audience response system.

Among the signals that the signal generating logic 440 decodes are user selection signals transmitted by response devices in the audience response system. As discussed above, a user selection signal commonly encodes data representing the user selection or multiple user selections.

The device 400 also includes a transceiver 450 which operably connects to the processor 430. Although the transceiver 450 is illustrated as separate from the processor 430, it should be understood that the transceiver 450 and processor 430 may be part of the same component. In an alternative embodiment (not shown), the device 400 may include a transmitter and a separate receiver instead of a transceiver.

The transceiver 450 transmits wireless signals encoded by the signal generating logic 440. The transceiver 450 also receives wireless signals.

In one embodiment, for every signal received by the transceiver 450 from a response device, the signal generating logic 440 generates an acknowledgement signal, and the transceiver 450 transmits the acknowledgment signal.

Acknowledgement signals may encode data indicating to the response device to transmit data request signals. In response to receipt of an acknowledgement signal encoding data indicating to transmit data request signals, the response device transmits data request signals. Data request signals indicate to the base 400 to transmit bulk data signals to the response device.

In one embodiment, in response to the transceiver 450 receiving a data request signals, the signal generating logic 440 encodes and the transceiver 450 transmits acknowledgement signals, an acknowledgement signal corresponding to each of the data request signals received. In addition to the acknowledgement signal, the signal generating logic 440 may encode and the transceiver 450 may transmit a bulk data signal corresponding to each of the data request signals received. In another embodiment, in response to the transceiver 450 receiving a data request signal, the signal generating logic 440 may encode and the transceiver 450 may transmit only a bulk data signal corresponding to each of the data request signals received. In this embodiment, the bulk data signals themselves may serve as acknowledgement that the data request signal transmissions were received.

In the illustrated embodiment, the base 400 includes a mapping logic 460 operably connected to the processor 430. The mapping logic 460 maps the bulk data to divide it and organize it in portions that may be transmitted in a single bulk data signal. The aggregate of the bulk data signals communicates the entire bulk data.

In one embodiment, mapping of the bulk data may depend on which specific response device sent the data request signal. In the multiple question exam example, the mapping logic may map questions in the exam in different order for two different response devices to discourage cheating.

The mapping logic 460 may also create the data describing the bulk data. The response device may make use of the data describing the bulk data to calculate time intervals at which to send data request signals. For example, data describing bulk data may be data indicating a total number of transmissions from the base 400 to the response device to transmit the entire bulk data from the base 400 to the response device. As discussed above, in the multiple question exam example, data describing the bulk data may also include data indicating the total number of questions in the multiple question exam, or data indicating one or more formats (e.g. fill in the blank, multiple choice, single answer numeric, single answer alpha, true or false, multi-answer numeric, multi-answer alpha, and so on) of the questions in the multiple question exam. In the firmware update example, data describing the bulk data may also include data describing the firmware update.

In response to data request signals, the transceiver 450 may transmit bulk data signals, signals encoding data describing the bulk data and signals encoding a portion of the bulk data, in any order. In one embodiment, the transceiver transmits three bulk data signals encoding data describing the bulk data in response to the first three data request signals received and a fourth bulk data signal encoding a portion of the bulk data in response to the fourth data request signal received. In other embodiments, in response to data request signals, the transceiver may transmit more or less than three bulk data signals encoding data describing the bulk data in response to the first three data request signals received. For example, the transceiver may transmit a bulk data signal encoding data describing the bulk data in response to the first data request signal, a bulk data signal encoding a portion of the bulk data in response to the second data request signal, and another bulk data signal encoding data describing the bulk data in response to the third data request signal.

In some embodiments, a bulk data signal may encode data indicating that either the data describing the bulk data or the portion of the bulk data due next for transmission is not ready for transmission. In these cases, the data describing the bulk data or the portion of the bulk data due next for transmission would be encoded in a later received bulk data signal.

In some embodiments, the base 400 may transmit bulk data signals in response to a data request signal as the bulk data becomes available, as bulk data signals are generated, as bulk data is mapped by the mapping logic 460, and so on. Thus, for example, in response to a first data request signal, the base 400 may transmit a first bulk data signal indicating to the response device that bulk data is not yet available for transmission. At a later time, in response to a second data request signal, the base 400 may transmit a second bulk data signal encoding data describing bulk data, a portion of bulk data, or a combination thereof.

Figure 5:
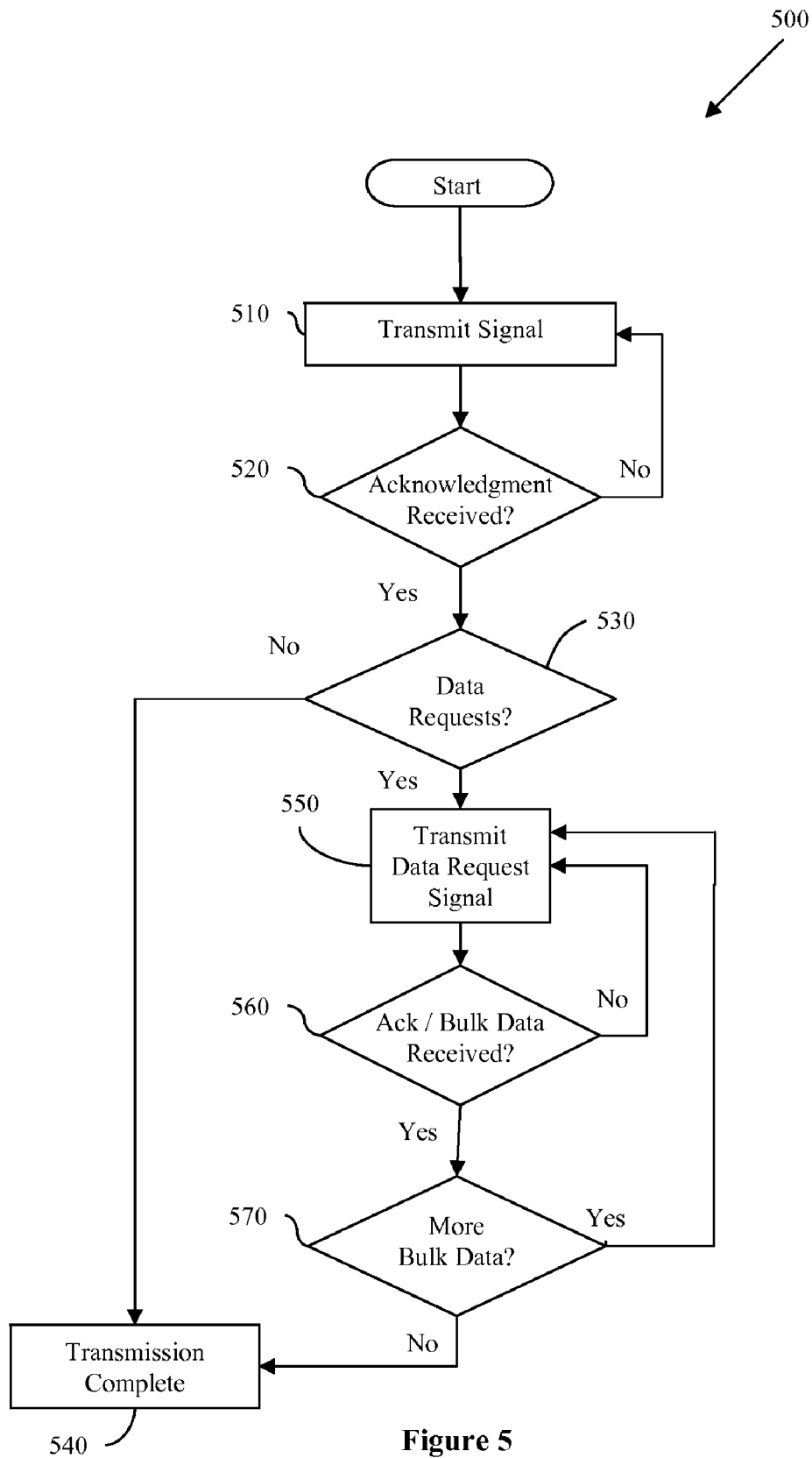
FIG. 5 illustrates a flow chart of an exemplary method for a response device in an audience response system having a plurality of response devices to wirelessly communicate bulk data.
Figure 6:
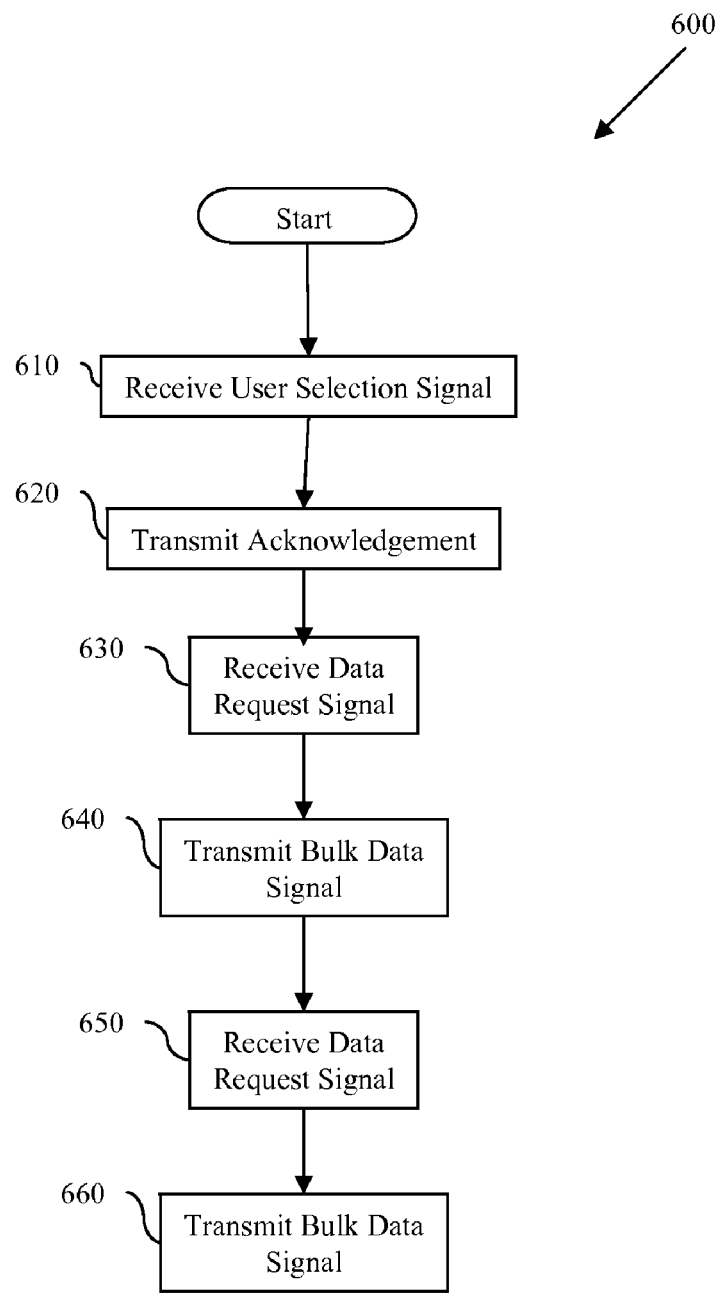
FIG. 6 illustrates a flow chart of an exemplary method for a base in an audience response system having a plurality of response devices to wirelessly communicate bulk data.

Example methods may be better appreciated with reference to the flow diagrams of FIGS. 5 and 6. For purposes of simplicity of explanation, the illustrated methodologies are shown and described as a series of blocks. However, the methodologies are not limited by the order of the blocks, as some blocks can occur in different orders or concurrently with other blocks from that shown or described. Moreover, less than all the illustrated blocks may be required to implement an example methodology. Furthermore, additional or alternative methodologies can employ additional blocks that are not illustrated.

In the flow diagrams, blocks denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

In one example, methodologies are implemented as processor executable instructions or operations provided on a computer-readable medium. Thus, in one example, a computer-readable medium may store processor executable instructions operable to perform the methods of FIGS. 5 and 6. While the methods are described as provided on a computer-readable medium, it is to be appreciated that other example methods described herein can also be provided on a computer-readable medium.

While FIGS. 5 and 6 illustrate various actions occurring in serial, it is to be appreciated that various actions illustrated in FIGS. 5 and 6 could occur substantially in parallel. While a number of processes are described, it is to be appreciated that a greater or lesser number of processes could be employed and that lightweight processes, regular processes, threads, and other approaches could be employed. It is to be appreciated that other example methods may, in some cases, also include actions that occur substantially in parallel.

FIG. 5 illustrates a flow chart for an exemplary method 500 for a response device in an audience response system having a plurality of response devices to wirelessly communicate bulk data. At 510, the response device transmits a signal. At 520, if an acknowledgement signal is not received within a certain period of time, the method 500 returns to 510 and retransmits the signal. In one embodiment (not shown), after repeated transmissions of the signal without receiving the acknowledgement signal or after expiration of a time limit after the first transmission of the signal or some other time period, the response device declares failure in the transmission of the signal.

At 520, if the acknowledgement signal is received, the response device determines whether the acknowledgement signal encodes data indicating to the response device to transmit data request signals, at 530.

If the acknowledgement signal does not encode data indicating to the response device to transmit data request signals, the response device declares that the transmission is complete at 540. If the acknowledgement signal encodes data indicating to the response device to transmit data request signals, the response device transmits a data request signal at 550. At this point, the method 500 may run parallel tasks (e.g. one transmitting user selection signals and another transmitting data request signals). Thus, transmissions of data request signals and receiving of bulk data signals may intersperse transmissions and receiving of other signals (e.g. user selection signals, non user selection signals, and so on) and other transactions between the base and the response device.

At 560, if an acknowledgement signal or a bulk data signal is not received within a certain period of time, the method 500 returns to 550 and retransmits the data request signal. In one embodiment (not shown), after repeated transmissions of the data request signal without receiving the acknowledgement signal or the bulk data signal, or after expiration of a time limit after the first transmission of the data request signal, or some other time period, the response device declares failure in the transmission of the data request signal.

If the acknowledgement signal or the bulk data signal is received at 560, the method 500 determines whether to transmit additional data request signals at 570. If yes, the method 500 returns to 550 and transmits a data request signal. If no, the response device declares that the transmission is complete at 540. The portions of bulk data are decoded from each bulk data signal and stored in a data store.

FIG. 6 illustrates a flow chart for an exemplary method 600 for a base in an audience response system to wirelessly communicate bulk data. At 610, the base receives a user selection signal. At 620, in response to the received user selection signal, the base transmits an acknowledgement signal. The acknowledgement signal encodes data indicating to the response device to transmit data request signals.

At 630, the base receives a first data request signal from the response device. At 640, in response to the first data request signal, the base transmits a first bulk data signal. At 650, the base receives a second data request signal from the response device. At 660, in response to the second data request signal, the base transmits a second bulk data signal. In one embodiment, a bulk data signal also serves as an acknowledgement. In another embodiment (not shown), in response to each data request signal, the base transmits two signals: a discrete acknowledgement signal and a discrete bulk data signal.

In one embodiment, the bulk data signal may encode data indicating to the response device that bulk data is not ready for transmission. The bulk data signal may also encode data indicating to the response device to send a subsequent data request signal to obtain the bulk data not yet available for transmission.

The method 600 may run parallel tasks (e.g. one receiving user selection signals and another receiving data request signals). Thus, receiving of data request signals and transmission of bulk data signals may intersperse receiving and transmission of other signals (e.g., user selection signals, non user selection signals, and so on) and other transactions between the base and the response device.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A method to wirelessly communicate bulk data in an audience response system having a plurality of response devices, the method comprising:
   receiving a user selection at a response device;
   transmitting a user selection signal upon receipt of the user selection;
   receiving a user selection acknowledgement signal encoding data indicating to the response device to transmit data requests;
   transmitting a first data request signal;
   receiving a first bulk data signal encoding at least data describing the bulk data;
   transmitting a second data request signal; and
   receiving a second bulk data signal encoding a portion of the bulk data;
   transmitting at least one additional data request signal, based on milestones being reached in bulk data already received by the response device, where the milestones are selected from the group consisting of:
   a percentage of the bulk data being consumed,
   a percentage of the bulk data received being consumed,
   a marker in the bulk data being reached,
   the end of the bulk data received being reached, and
   a question from a plurality of questions in the bulk data received being reached.

2. The method of claim 1 further comprising:
   after transmitting the first data request signal, receiving a first data request acknowledgement signal; and
   after transmitting the second data request signal, receiving a second data request acknowledgement signal.

3. The method of claim 1, where at least one of the user selection signal, the first bulk data request signal, and the second bulk data request signal encodes data representing at least one of:
   a user identification uniquely identifying a user of the response device,
   a globally unique identifier (GUID), and
   a response device identification uniquely identifying the response device in the system audience response system.

4. The method of claim 1, where the transmitting the first data request signal occurs upon expiration of a time interval after receipt of the user selection acknowledgement signal, where the time interval is randomly selected from a range of time intervals.

5. The method of claim 1, further comprising:
   in response to the first data request signal, receiving a signal encoding data indicating that the data describing the bulk data is not ready for transmission.

6. The method of claim 1, further comprising:
   in response to the second data request signal, receiving a signal encoding data indicating that the portion of the bulk data is not ready for transmission.

7. The method of claim 1, where the first bulk data signal further encodes a portion of the bulk data different from the portion encoded in the second bulk data signal.

8. The method of claim 1, where the data describing the bulk data includes at least one of:
   data indicating a total number of the multiple data requests,
   data describing a firmware update,
   data indicating a total number of questions in the bulk data, and
   data indicating one or more formats of the questions in the bulk data, where the formats include at least one of:
   fill in the blank,
   multiple choice,
   single answer numeric,
   single answer alpha,
   true or false,
   multi-answer numeric,
   essay,
   multi-digit numeric,
   fraction,
   equation, and
   multi-answer alpha.

9. A response device configured to communicate wirelessly in an audience response system having a plurality of response devices, the device comprising:
   a user input interface configured to receive user selections;
   a processor operably connected to the user input interface and configured to receive data representing the user selections;
   a signal generating logic operably connected to the processor and configured to generate user selection signals and data request signals; and
   a transceiver operably connected to the processor and the signal generating logic and configured to transmit the user selection signals and the data request signals, where the transceiver is further configured to receive acknowledgement signals and bulk data signals,
   where a first acknowledgement signal encodes data indicating to transmit the data request signals and the transceiver is configured to transmit a first data request signal in response to the first acknowledgment signal,
   where a first bulk data signal encodes at least data describing the bulk data, and
   where a second bulk data signal encodes at least a portion of the bulk data; and
   a fetching logic operably connected to the processor and to the transceiver, where the fetching logic is configured to determine when additional bulk data is required, based on consumption of the bulk data, and where the fetching logic is further configured to communicate a signal to the transceiver indicating when to transmit the data request signals.

10. The device of claim 9, where the fetching logic is configured to determine a pace at which the bulk data received is consumed, and where the fetching logic is further configured to communicate a signal to the transceiver indicating when to transmit the data request signals such that bulk data signals are received at a rate that substantially corresponds to the pace at which the bulk data received is consumed.

11. The device of claim 9, where the fetching logic is configured to determine when milestones in the bulk data received are reached, and where the fetching logic is further configured to communicate a signal to the transceiver indicating when to transmit the data request signals such that bulk data signals are received at times substantially corresponding to the reaching of the milestones.

12. The device of claim 11, where the milestones include at least one of:
    a percentage of the bulk data being consumed,
    a percentage of the bulk data received being consumed,
    a marker in the bulk data being reached,
    the end of the bulk data received being reached, and
    a question from a plurality of questions in the bulk data received being reached.

13. The device of claim 9, where the transceiver is configured to scan for radio frequency signal traffic of the audience response system, and where the transceiver is configured to transmit at least some of the data request signals at a time when the radio frequency signal traffic is below a predetermined threshold.

14. The device of claim 9, where the signal generating logic is configured to encode in at least one of the user selection signals and the data request signals data representing at least one of:
    a user identifier uniquely identifying a user of the response device,
    a globally unique identifier (GUID), and
    a response device identifier uniquely identifying the response device in the audience response system.

15. The device of claim 9, further comprising:
    an interval logic operably connected to the processor and configured to generate time intervals, where the transceiver is configured to transmit a data request signal upon expiration of a time interval.

16. A method to wirelessly communicate bulk data in an audience response system having a plurality of response devices, the method comprising:
    wirelessly transmitting data representing a user selection;
    wirelessly receiving data indicating to the response device to transmit data requests;
    wirelessly transmitting data requests;
    wirelessly receiving at least data describing the bulk data in response to a first data request; and
    wirelessly receiving at least a portion of the bulk data in response to a second data request,
        where the wirelessly transmitting the data requests occurs based on milestones being reached in bulk data already received by the response device,
    where the milestones are selected from the group consisting of:
        a percentage of the bulk data being consumed,
        a percentage of the bulk data received being consumed,
        a marker in the bulk data being reached,
        the end of the bulk data received being reached, and
        a question from a plurality of questions in the bulk data received being reached.

17. The method of claim 16, further comprising:
    scanning for radio frequency signal traffic corresponding to response devices in the audience response system other than the response device, where the transmitting the second data request occurs at a time when the radio frequency signal traffic is below a predetermined threshold.

18. The method of claim 16, where the data describing the bulk data includes at least one of:
    data indicating a total number of data requests that will be necessary to receive all the bulk data,
    data describing a firmware update,
    data indicating a total number of questions in the bulk data, and
    data indicating one or more formats of the questions in the bulk data.

19. The method of claim 16, further comprising:
    determining a pace at which the bulk data received is being consumed, where the transmitting of data requests occurs such that bulk data is received at a rate that substantially corresponds to the pace at which the bulk data received is being consumed.

20. A response device configured to communicate wirelessly in an audience response system having a plurality of response devices, the device comprising:
    a user input interface configured to receive user selections;
    a processor operably connected to the user input interface and configured to receive data representing the user selections;
    a signal generating logic operably connected to the processor and configured to generate user selection signals and data request signals; and
    a transceiver operably connected to the processor and the signal generating logic and configured to transmit the user selection signals and the data request signals, where the transceiver is further configured to receive acknowledgement signals and bulk data signals,
        where a first acknowledgement signal encodes data indicating to transmit the data request signals and the transceiver is configured to transmit a first data request signal in response to the first acknowledgment signal,
        where a first bulk data signal encodes at least data describing the bulk data,
        where a second bulk data signal encodes at least a portion of the bulk data, and
        where the transceiver is configured to scan for radio frequency signal traffic of the audience response system, and where the transceiver is configured to transmit at least some of the data request signals at a time when the radio frequency signal traffic is below a predetermined threshold.

21. A method of wirelessly communicating bulk data in an audience response system having a plurality of response devices, the method comprising:
    wirelessly transmitting data representing a user selection;
    wirelessly receiving data indicating to the response device to transmit data requests;
    wirelessly transmitting data requests;
    wirelessly receiving at least data describing the bulk data in response to a first data request;
    wirelessly receiving at least a portion of the bulk data in response to a second data request; and
    scanning for radio frequency signal traffic corresponding to response devices in the audience response system other than the response device, where the transmitting the second data request occurs at a time when the radio frequency signal traffic is below a predetermined threshold.

* * * * *